United States Patent
Yeh et al.

(10) Patent No.: US 7,206,028 B2
(45) Date of Patent: Apr. 17, 2007

(54) METHOD AND APPARATUS OF ADAPTIVE DE-INTERLACING OF DYNAMIC IMAGE

(75) Inventors: Ting-Kun Yeh, Taipei (TW); Jackie Hsiung, Taipei (TW); Sheng-Che Tsao, Taipei (TW); An-Te Chiu, Taipei (TW)

(73) Assignee: VIA Technologies, Inc. (TW)

( * ) Notice: Subject to any disclaimer, the term of this patent is extended or adjusted under 35 U.S.C. 154(b) by 508 days.

(21) Appl. No.: 10/851,224

(22) Filed: May 24, 2004

(65) Prior Publication Data
US 2004/0233327 A1    Nov. 25, 2004

(51) Int. Cl.
*H04N 7/01*    (2006.01)

(52) U.S. Cl. ...................................... 348/448; 348/452

(58) Field of Classification Search ................ 348/448, 348/441, 451, 452, 458, 459; *H04N 7/01, H04N 11/20*
See application file for complete search history.

(56) References Cited

U.S. PATENT DOCUMENTS

| 6,108,047 A * | 8/2000 | Chen ........................... 348/448 |
| 6,330,032 B1 * | 12/2001 | Boehlke ...................... 348/452 |
| 7,057,665 B2 * | 6/2006 | Jung et al. .................. 348/452 |
| 7,129,987 B1 * | 10/2006 | Westwater ................... 348/441 |

* cited by examiner

*Primary Examiner*—Sherrie Hsia

(57) ABSTRACT

The present invention provides a method and apparatus of adaptive de-interlacing of dynamic image, configured for calculating encoding information of a dynamic image to acquire an image shift value of field and then compare the image shift value of field with a programmable threshold. When the image shift value of field is substantially greater than the threshold, then choosing Bob algorithm for de-interlacing; otherwise, when the image shift value of field is substantially less than the threshold, then choosing Weave algorithm for de-interlacing to constitute a high-resolution motion image.

15 Claims, 6 Drawing Sheets

METHOD AND APPARATUS OF ADAPTIVE DE-INTERLACING OF DYNAMIC IMAGE

BACKGROUND OF THE INVENTION

1. Field of the Invention

This present invention generally relates to a method and apparatus of de-interlacing of dynamic image, and more particularly to a method and apparatus of adaptive de-interlacing of dynamic image, in which calculation and determination are processed in accordance with taking a field as a process unit of dynamic image.

2. Description of the Prior Art

As digital products develop, there are usually incompatible problems with analog products accompanied. There are two kinds of scanning standard of analog television at present, i.e. National Television System Committee (NTSC) and Phase Alternation by Line (PAL). Standard of NTSC is used in Japan or the US, according to which a frame is formed by 525 scanning lines i.e. 525 scanning lines are called a frame, which means the frame is displayed repeatedly at the speed of 30 frames per second. Yet 525 scanning lines that form a frame are not finished in only one scanning. The frame is displayed by scanning one line and then the line following the next line. In other words, after the first line is scanned, the third line is scanned rather than the second line, and then the fifth, seventh, to the 525th line respectively. Then the scanning process returns to the second line and repeats, in the following are the fourth, sixth, eighth, etc. The formatting method of which is called "double-space scanning" or "interlacing". Therefore an interlaced video signal is composed of two fields, each of the two fields containing odd lines or even lines of the image. Since field of odd lines and field of even lines are formed by only half amount of scanning lines (262.5 lines), each field of odd lines and field of even lines only has half of the resolution the original image has. Each field of odd lines and field of even lines is displayed at the speed of 60 fields per second.

The advantage of interlacing scanning is that dynamic image is displayed smoothly, and the disadvantage is that the screen glitters. Thus, the disadvantages of "interlacing scanning" can be eliminated by a technique called "progressive scan". In progressive scan, the first, second, third, to the 525th line are scanned in order and displayed at the speed of 60 frames per second. Therefore its scanning speed is twice the scanning speed of "interlacing" and the frame is displayed on the monitor with 525 scanning lines, which makes the frame fine and clear, which being the best merit of "progressive scan". Therefore, most of the developed video and audio at present has used this method for scanning and displaying. However, current video signal of NTSC system uses mainly the method of "interlacing" so far. Therefore, if a frame constituted by interlacing is displayed by a display system using a progressive scan, for instance, when a DVD film edited by interlacing is directly broadcast and displayed on HDTV, only frame of odd lines and frame of even lines can be displayed and the resolution of image will be worse (that's because it only has half resolution of that). To solve this problem, the technique of "de-interlacing" should be used. In other words, de-interlacing is a method to convert interlacing to a progressive scan.

There are two basic algorithms to choose from in the technique of de-interlacing process, non-motion compensated and motion-compensated; wherein the non-motion compensated de-interlacing algorithm further comprising two basic linear transformation techniques, which are called Weave and Bob. To weave is two input fields overlaid or woven together to produce a progressive frame. While Bob only accept one of the fields of input image (for instance, image of even lines), and the other field (i.e. image of odd lines) is discarded, the vertical resolution of image will decrease from 720×486 to 720×243. The voids of the discarded lines are filled in by adjacent scanning lines in this image with only half of the resolution in order to regain the resolution of 720×486.

As regards the motion compensated de-interlacing algorithm, it comprises shifting pixels of two temporal shift fields to a common point in one instant and forming a frame, wherein detecting and determining of motion vectors can be used for cutting the fields into a plurality of macro blocks further and then executing by the procedure of block-matching. Moreover, when taking a macro block as identification of motion vector, actually only the luminance block (i.e. Y block) of the macro block is chosen for executing, and the saturation block (i.e. $C_r$ block and $C_b$ block) is discarded. The main reason is that human's eyes is sensitive to the change of luminance and is less sensitive to the change of saturation respectively. Therefore under the requirement of reducing the processing amount of data, in the process of MPEG compression (or encoding), only the luminance block is taken as the basis of identification of motion vector.

Since current image capture system (for instance, a digital camera) adopts the method of interlacing scanning, thus DVD films edited by those images have to broadcast in the display device of interlacing for presenting higher resolution images. To eliminate the disadvantages of interlacing, we should choose a method of Weave or Bob for broadcast in order to convert interlacing scanning to progressive scan in a player device. However, to a dynamic image, when we choose the Weave method for broadcast, misalignment of image will occur since there is a temporal shift between images of odd lines and images of even lines. Therefore there will be serration or feathering and thus produces a blurred frame. To a still image, when we choose the Bob method for broadcast, although the misalignment of image will be overcome and a clear and natural dynamic image can be produced, the vertical resolution of a still image will be sacrificed. It's therefore that, between current video/audio player system and digital display system, we cannot give consideration to the image quality of a frame with motion and a still frame when processing de-interlacing.

Besides, in the process of editing a VCD or DVD film, in accordance with some video/audio players using standard of Joint Photographic Experts Group (JPEG) or those films edited by using I-frame of MPEG compressing standard in one disc and films without compression, since dynamic image might only include encoding information of I-frame or only include information of dynamic image, it cannot extract motion vectors of P-frame or B-frame of MPEG compression when playing such kind of film in the video/audio player system and therefore encoding incompatible problem occurs. Consequently, it cannot play such kind of film without motion vectors in the player system and it's not convenient for users.

SUMMARY OF THE INVENTION

The present invention provides a method of adaptive de-interlacing of dynamic image in accordance with taking a field as a process unit for de-interlacing. These steps comprise: first, calculating an image shift value of field according to the image encoding information, wherein this step further comprises detecting the dynamic image to see whether it contains motion vectors or not. Next, comparing the image shift value of field with a programmable threshold for determining a de-interlacing algorithm and being a basis of de-interlacing process of the dynamic image. Furthermore, Bob algorithm is chosen for de-interlacing process when the image shift value of field is substantially greater than the threshold; otherwise, Weave algorithm is chosen for de-interlacing process when the image shift value of field is substantially less than the threshold. And next, executing the de-interlacing algorithm for completing de-interlacing process of the dynamic image.

The present invention also provides an apparatus of adaptive de-interlacing of dynamic image, comprising: a detecting unit, configured for receiving and detecting encoding information of a dynamic image, and then outputting encoding information of the dynamic image and the detection result; a calculating unit, configured for calculating and processing encoding information of the dynamic image outputted from the detecting unit, then outputting an image shift value of field; a determining unit, configured for receiving and comparing the image shift value of field with a $2^{nd}$ threshold, then outputting information of determination; a processing unit of video images, configured for receiving the determination information and then choosing a de-interlacing algorithm for constituting the dynamic image.

According to this, the method and apparatus of de-interlacing of dynamic image of the present invention solves some problems. For instance, we can give consideration to image quality of a frame with motion and a still frame when processing de-interlacing between current video/audio player system (for instance, a VCD player or DVD player) and digital display system (for instance, HDTV or plasma TV). Therefore, higher-resolution images are produced and the requirement of quality of audio/video player for users is satisfied.

DESCRIPTION OF THE PREFERRED EMBODIMENT

The complete process of MPEG compressing technique and method used in the present invention is not included in the following description. And the block diagrams in the following text are not made according to relative position in reality and complete connect diagram, the function of which is only to illustrate the features of the invention.

Figure 1:
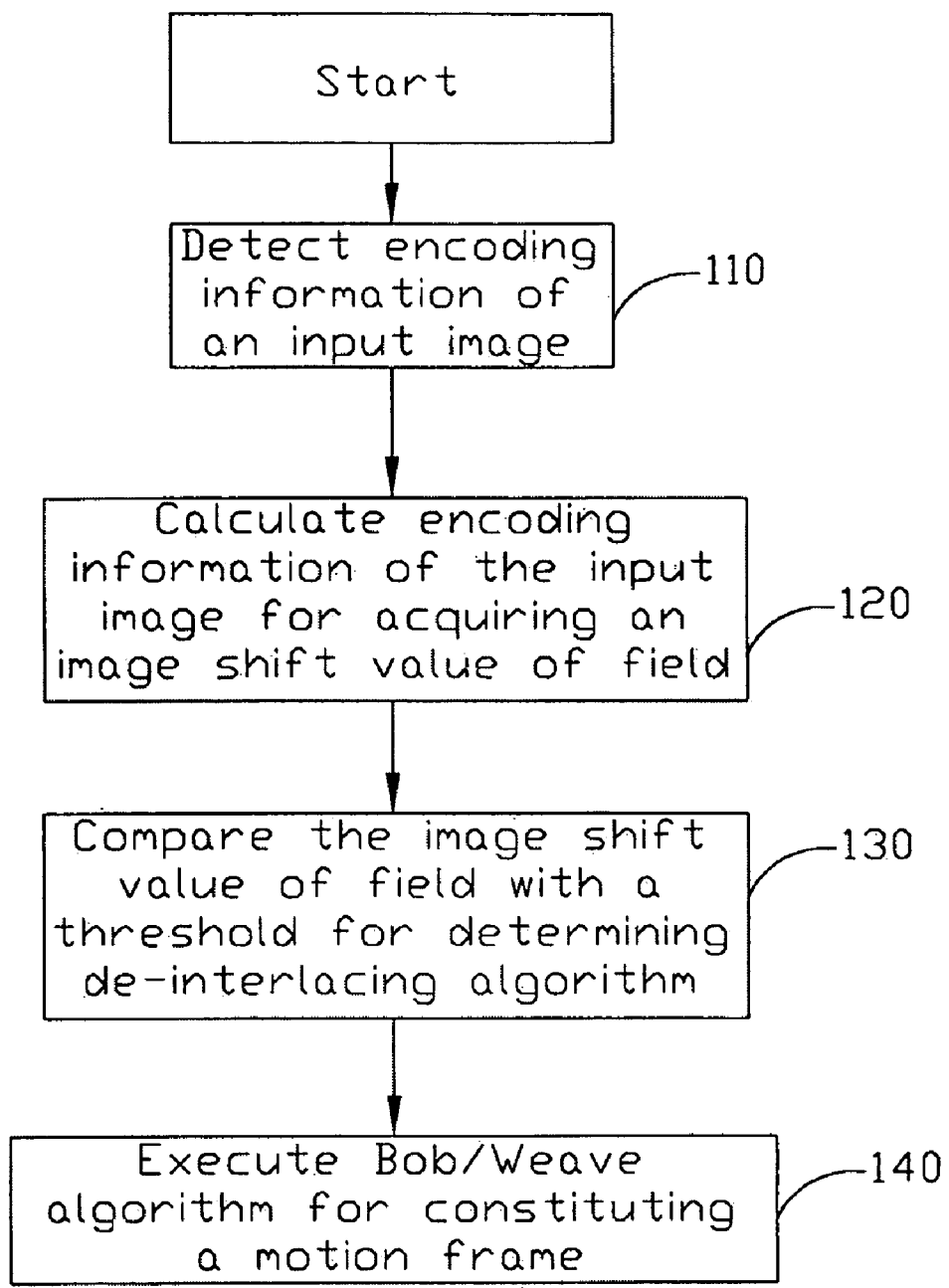
FIG. 1 schematically shows the flow chart of the present invention.

FIG. 1 schematically shows the flow chart of adaptive de-interlacing procedure of the present invention. First, in step 110, detecting encoding information of an input image. Next, in step 120, calculating encoding information of the input image for acquiring an image shift value of field. In the process of calculating the image shift value of field, when encoding information of the input image (in step 110) is detected that it contains a motion vector, then calculating the motion vector and comparing calculation value of the motion vector with a $1^{st}$ threshold. After the comparison, then accumulating the number of times of calculation value that is higher than the $1^{st}$ threshold for being an image shift value of field. The $1^{st}$ threshold is adjusted in accordance with requirement of image quality of video display and performance of player system; in other words, the $1^{st}$ threshold is a programmable threshold. When encoding information of the input image (in step 110) is detected that it doesn't contain a motion vector, then calculating total amount of pixels of luminance (Y) within odd fields and even fields of encoding information of the input image. After the calculation, choosing a calculation method for outputting an image shift value of field. Furthermore, the calculation method can be getting absolute value of difference between total amount of pixels of Y value within adjacent odd fields; getting absolute value of difference between total amount of pixels of Y value within adjacent even fields; or getting absolute value after subtraction of the absolute values of differences between the total amount of pixels of Y value within odd fields and total amount of pixels of Y value within even fields for being the image shift value of field.

After acquiring the image shift value of field, step 130 compares the image shift value of field with a $2^{nd}$ threshold. The $2^{nd}$ threshold is also adjusted in accordance with requirement of image quality of video display, performance of player system and the detection result in step 110; in other words, the $2^{nd}$ threshold is also a programmable threshold. In accordance with the comparison result in step 130, wherein Bob algorithm is chosen (in step 140) for de-interlacing process when the image shift value of field is substantially greater than the threshold. Otherwise, Weave algorithm is chosen (in step 140) for de-interlacing process when the image shift value of field is substantially less than the threshold.

Figure 2A:
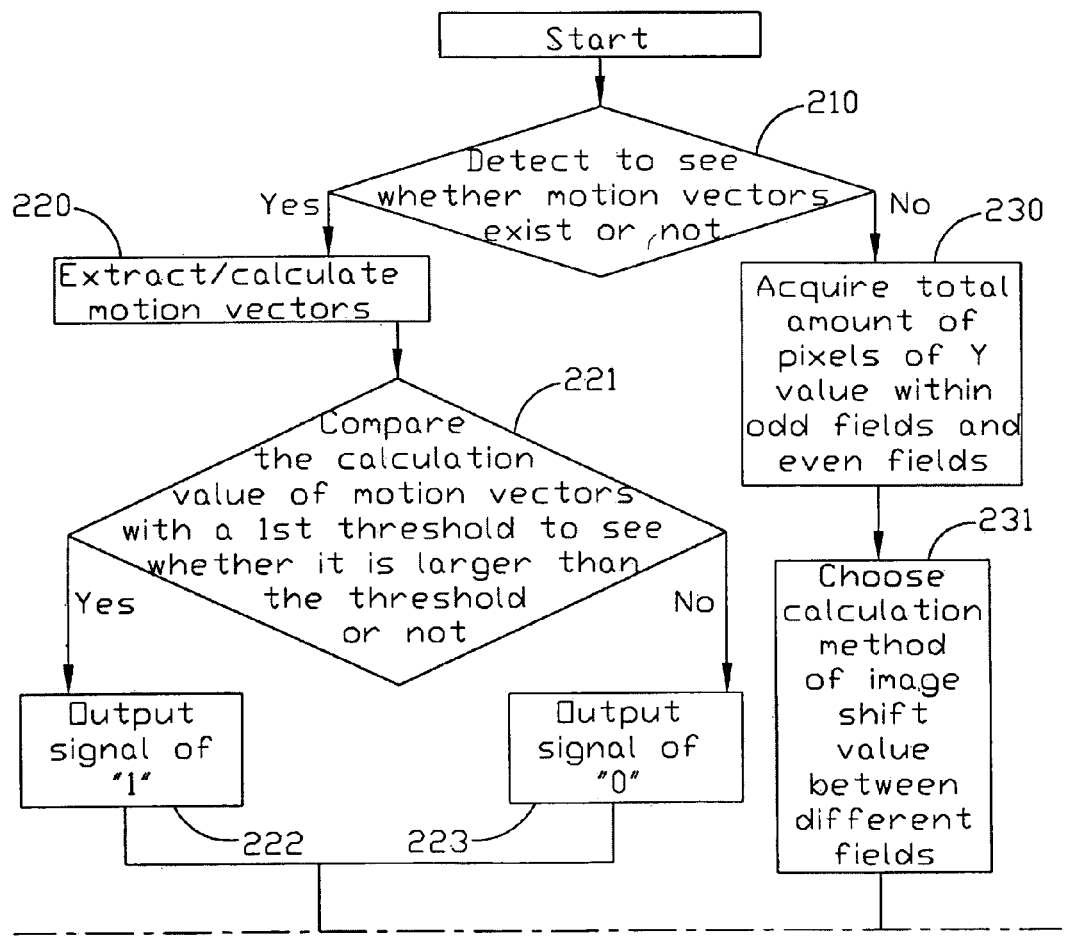
FIG. 2 schematically shows the flow chart of one embodiment of the present invention.
Figure 2B:
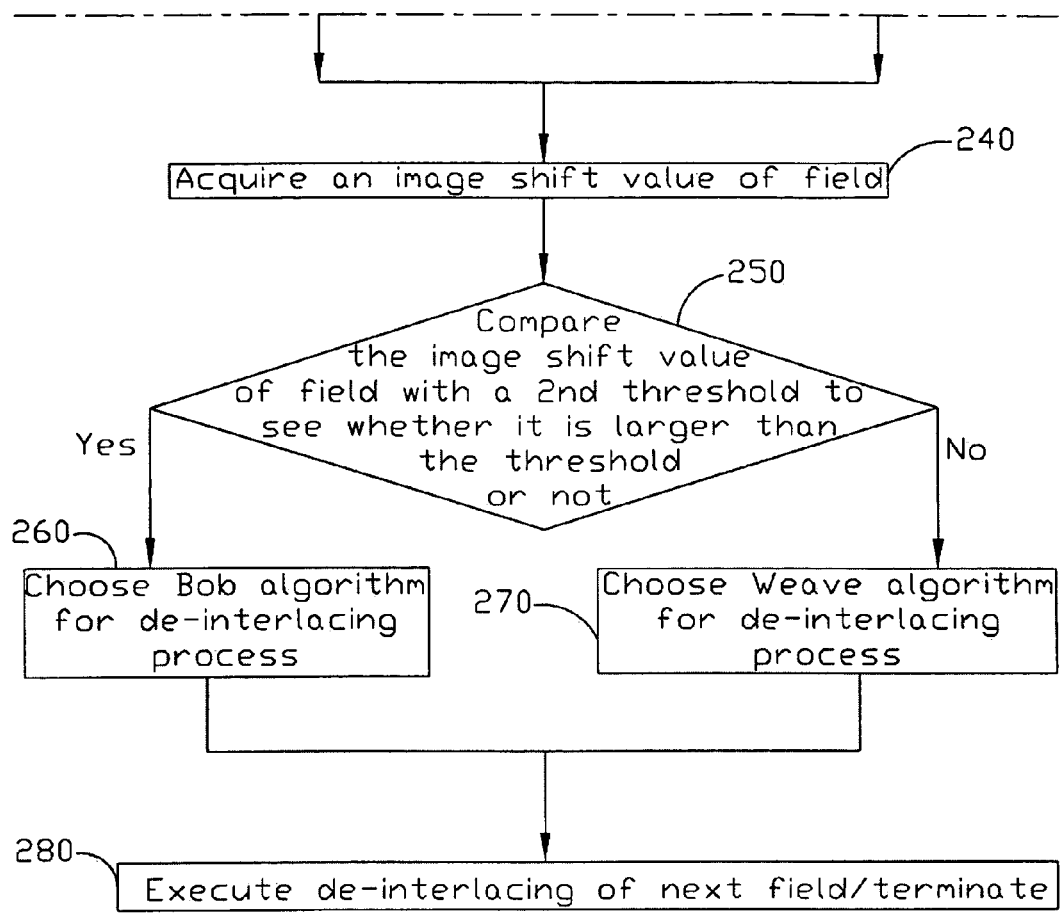

FIG. 2 schematically shows the flow chart of field-based adaptive de-interlacing algorithm of the embodiment described above according to the present invention. In step 210, determining and detecting to see whether motion vectors exist or not. When encoding information of the input image is detected that it contains motion vectors, then step 220 reads and calculates the motion vectors in accordance with MPEG compression standard for acquiring the calculation values of the motion vectors. Moreover, the motion vectors can be extracted from P-frame or B-frame. For instance, the motion vectors extracted from each block of P-frame are (0, 0), (0, −2), (1, −3), (2, 5), (−2, −4), (−4, 8), (8, −10), (−6, 2), (−4, −2), (18, −10), (−10, −20), (−16, −30), (−8, 0), (−4, 4), (−6, 2) and (4, −5) respectively. In the following, adding each motion vector and getting the absolute value of that; therefore the calculation values of the motion vectors are 0, 2, 4, 7, 6, 12, 18, 8, 6, 28, 30, 46, 8, 8, 8 and 9 respectively. In step 221, comparing the calculation values of the motion vectors with a $1^{st}$ threshold. When the $1^{st}$ threshold is 10, there are five calculation values of the motion vectors (i.e. 12, 18, 28, 30 and 46) being higher than the $1^{st}$ threshold, then outputting in step 222 and 223 and accumulating the amount of the motion vector greater than the $1^{st}$ threshold in step 240 for being an image shift value of field. Thus, the image shift value of field is 5 in this example. In the following, in step 250, comparing the image shift value of field (which is acquired by step 240) with a $2^{nd}$ threshold. In accordance with the comparison result in step 250, wherein the field is a motion field processing displacement when the image shift value of field is greater than the $2^{nd}$ threshold; therefore, Bob algorithm is chosen for de-interlacing process in step 260. Otherwise, the field is a still field without displacement when the image shift value of field is less than the $2^{nd}$ threshold; therefore, Weave algorithm is chosen for de-interlacing process in step 270. And next, executing step 280.

On the other hand, when encoding information of the input image (in step 210) is detected that it doesn't contain any motion vectors, for instance, some video films of which the images are edited by using JPEG compression standard. Since there are no motion vector for calculating, it is therefore that accumulating total amount of pixels of luminance (Y) within odd fields and even fields of each frame (in step 230) for acquiring total amount of pixels of luminance (Y) within odd fields and even fields. Next, in step 231, choosing a calculation method for calculating the difference of pixels between different fields and then delivering the calculation result to step 240 for being an image shift value of field.

Since without encoding information of the motion vectors of the MPEG compression standard, it is therefore that only the dynamic image constituted by a series of I-frame can be detected, wherein each I-frame is formed by interlacing of an odd field and an even field. Thus, it can acquire total amount of pixels of Y value within odd fields and even fields. Consequently, the calculation method in step 230 can choose the way: subtracting total amount of pixels of Y value within odd fields of a reference frame (former frame or next frame) from total amount of pixels of Y value within odd fields of current frame and then getting absolute value of that for being the image shift value of field. It can also choose the way: subtracting total amount of pixels of Y value within even fields of a reference frame from total amount of pixels of Y value within even fields of current frame and then getting absolute value of that for being the image shift value of field. Besides, it can choose the way: subtracting the absolute value of difference between total amount of pixels of Y value within odd fields and even fields of a reference frame from the absolute value of difference between total amount of pixels of Y value within odd fields and even fields of current frame and then getting absolute value of that for being the image shift value of field. And FIG. 3 depicts the calculation method described above.

Figure 3A:
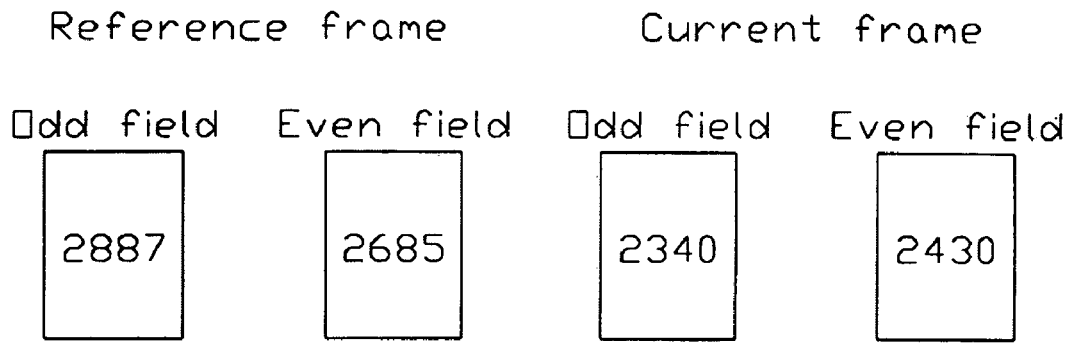
FIG. 3 schematically shows the diagram of calculation method of the image shift value of field in accordance with the present invention, wherein the field is a field without motion vectors.
Figure 3B:
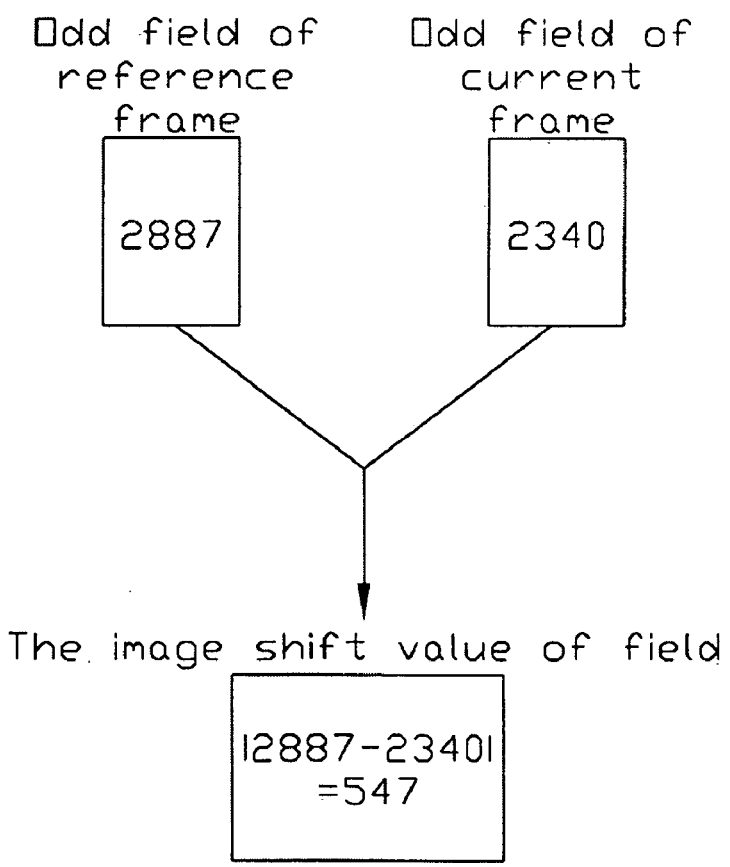
Figure 3C:
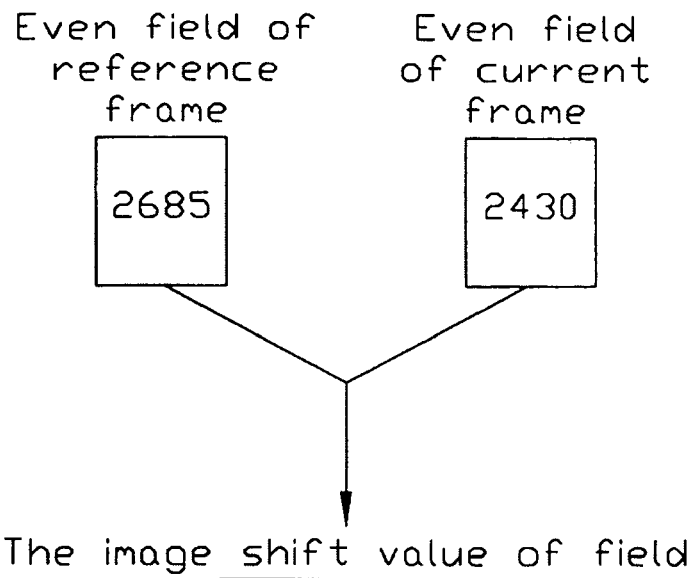
Figure 3D:
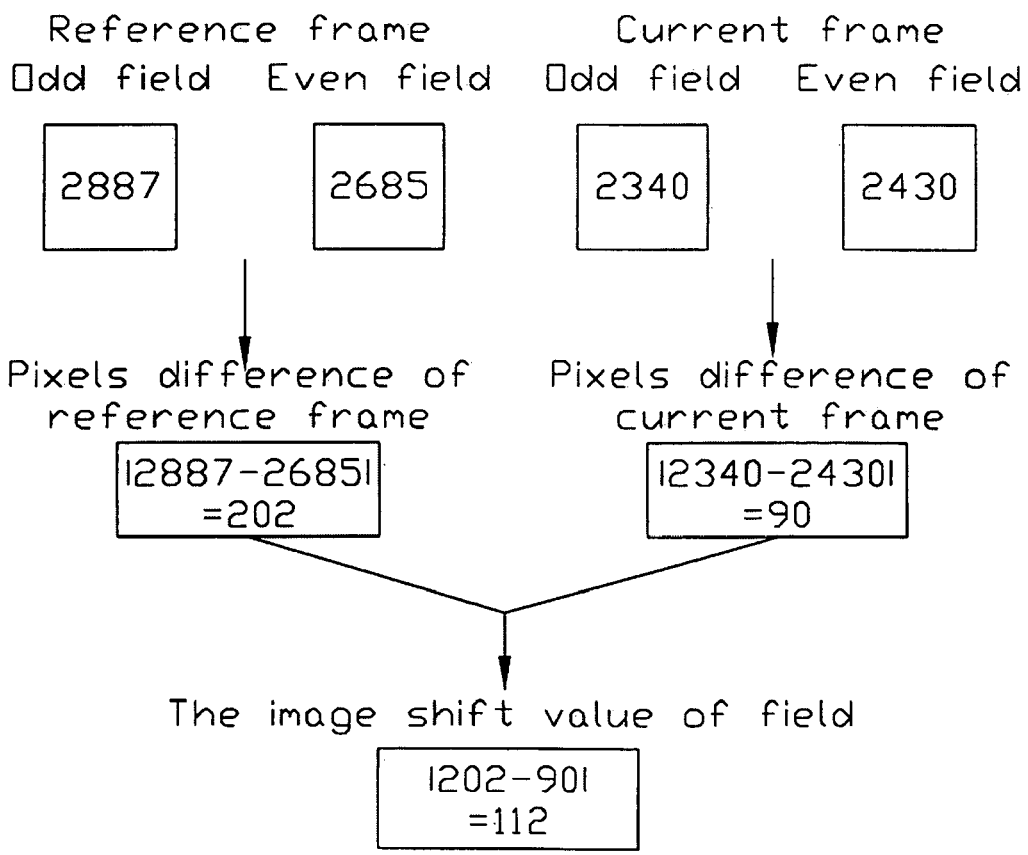

For instance, as is shown in FIG. 3A, total amount of pixels of Y value within odd fields of the reference frame is 2887 and total amount of pixels of Y value within odd fields of the current frame is 2340. Consequently, it acquires 547 by getting absolute value of the difference in total amount of pixels of Y value between adjacent odd fields (i.e. the image shift value of field is 547). Next, when choosing the way: subtracting total amount of pixels of Y value within even fields of a reference frame from total amount of pixels of Y value within even fields of the current frame. Thus, it acquires 255 by getting absolute value of the difference in total amount of pixels of Y value between adjacent even fields (i.e. the image shift value of field is 255), which is as shown in FIG. 3C. In the following, when choosing the way: subtracting the absolute value of difference between total amount of pixels of Y value within odd fields and even fields of a reference frame from the absolute value of difference between total amount of pixels of Y value within odd fields and even fields of the current frame, and then getting absolute value of that for being an image shift value of field, which is as shown in FIG. 3D. The absolute value of difference in total amount of pixels of Y value between odd field and even field of the reference frame is 202; while the absolute value of difference in total amount of pixels of Y value between odd field and even field of the current frame is 90. Consequently, it acquires 112 by getting absolute value of the difference in total amount of pixels of Y value between adjacent frames (i.e. the image shift value of field is 112).

In the following, delivering the image shift value of field by the different calculation method described above to step 240 and then preparing for process. After receiving a signal of a $2^{nd}$ threshold, for instance a $2^{nd}$ threshold is 250, and then comparing the image shift value of field (which is acquired by step 240) with the $2^{nd}$ threshold. The field is a motion field processing displacement when the image shift value of field is greater than the $2^{nd}$ threshold. Thus, in the example described above, the image shift values of field acquiring by the former two kinds of calculation method described above, within odd fields between adjacent frames and within even fields between adjacent frames, are 547 and 255 respectively. They are all greater than the $2^{nd}$ threshold (i.e. 250) and therefore Bob algorithm is chosen for de-interlacing process in step 260. Otherwise, the field is a still field without displacement when the image shift value of field is less than the $2^{nd}$ threshold. Thus, in the example described above, the image shift value of field acquiring by the $3^{rd}$ calculation method described above, the absolute value of the difference in total amount of pixels of Y value between adjacent frames is 112. It is less than the $2^{nd}$ threshold (i.e. 250) and therefore Weave algorithm is chosen for de-interlacing process in step 270.

In the detailed calculation process described above, further observing that the value acquired by the difference in total amount of pixels of Y value within odd fields between adjacent frames (or within even fields between adjacent frames) is usually higher; therefore it has higher sensitivity to the dynamic image. Similarly, the difference between total amount of pixels of Y value within odd fields and even fields of adjacent frames is lower respectively; therefore it has lower sensitivity to the dynamic image. Consequently, when playing a dynamic image, it has priority in using the difference in total amount of pixels of Y value within odd fields between adjacent frames (or within even fields between adjacent frames). Certainly, when an image broadcast is a still image (for instance, instructional films), through another control route (for instance, human operation), the difference between total amount of pixels of Y value within odd fields and even fields of adjacent frames can be chosen for being the image shift value of field. Consequently, the image is constituted with more Weave algorithm so that a high-resolution image is acquired for viewing.

After determining method of de-interlacing process of input image, then the field is detected to see whether it is an end of the frame or not. When the field is not the end of the frame, then executes detecting of next field in accordance with step 280 and repeats the steps described above; otherwise, when the field is the end of the frame, then stops the process.

Figure 4:
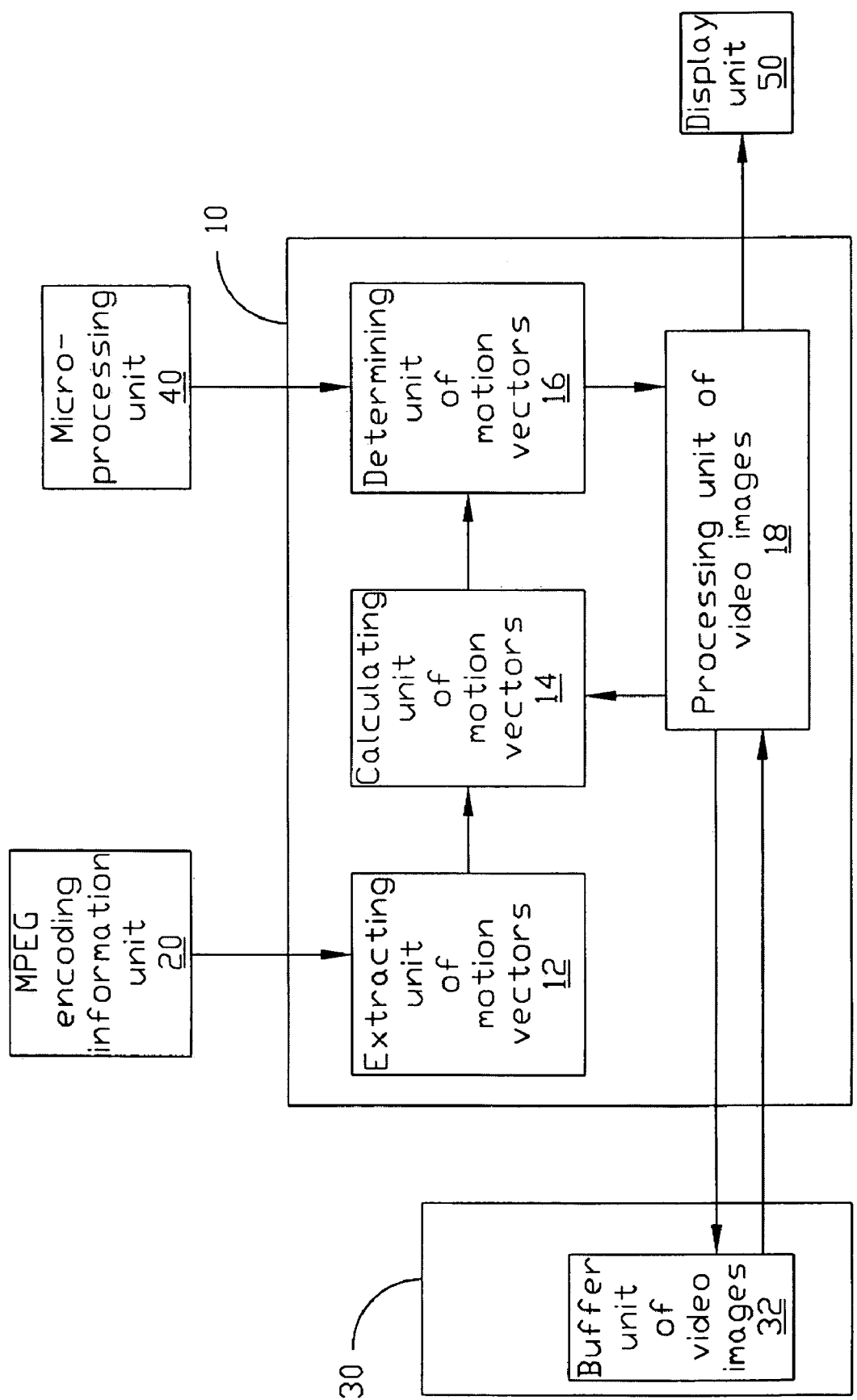
FIG. 4 schematically shows the block diagram of executing adaptive de-interlacing of the present invention.

In the following illustrates one embodiment of the present invention, as is shown in FIG. 4. FIG. 4 schematically shows the block diagram of executing adaptive de-interlacing of the present invention, comprising a processing unit of de-interlacing 10, configured for connecting with an encoding information unit 20, a buffer unit of video images 32 within a memory unit 30, a micro-processing unit 40 and a display unit 50. Moreover, the processing unit of de-interlacing 10 further comprises a detecting unit 12, a calculating unit 14, a determining unit 16 and a processing unit of video images 18.

First, the detecting unit 12 within the processing unit of de-interlacing 10 reads the encoding information from the encoding information unit 20 (for instance, DVD disc), the encoding information is detected to see whether it contains motion vectors or not and then connects with a micro-processing unit 40 by a signal. Next, delivering the encoding information to the calculating unit 14. When the encoding information contains motion vectors, the micro-processing unit 40 delivers a signal to the calculating unit 14 and then processes immediately extracting and calculating of motion vectors for acquiring a calculation value of motion vectors. In the meanwhile, the micro-processing unit 40 delivers a $1^{st}$ threshold to the calculating unit 14 for comparing the $1^{st}$ threshold with each calculation value of motion vectors one by one. In the comparison process, when the $1^{st}$ threshold is less than the calculation value of motion vectors and then outputs a signal of "1" to an accumulator. Similarly, when the $1^{st}$ threshold is higher than the calculation value of motion vectors and then outputs a signal of "0" to the accumulator (not shown in the calculating unit 14). Next, taking the accumulating result from the accumulator as the image shift value of field and then delivers to determining unit 16. Moreover, the $1^{st}$ threshold is determined according to requirement of image quality or performance of player system by the micro-processing unit 40; in other words, the $1^{st}$ threshold is a programmable threshold by the micro-processing unit 40.

When the encoding information doesn't contain motion vectors, then the detecting unit 12 delivers encoding information of the dynamic image contained in the encoding information unit 12 to the calculating unit 14. At this time, the micro-processing unit 40 delivers a signal for requiring the calculating unit 14 of adding the pixels of Y value within odd fields and even fields of current frame for acquiring total amount of pixels of Y value within odd fields and even fields of the current frame. In the meanwhile, the calculating unit 14 also acquires the reference frame information delivered from the processing unit of video images 18, wherein the reference frame information can be the information of the former frame or the next frame. Similarly, the calculating unit 14 adds the pixels of Y value within odd fields and even fields of the reference frame for acquiring total amount of pixels of Y value within odd fields and even fields of the reference frame. In the following, according to the information delivered from the micro-processing unit 40, it chooses the way: subtracting total amount of pixels of Y value within odd fields of a reference frame from total amount of pixels of Y value within odd fields of current frame and then getting absolute value of that for being the image shift value of field; otherwise, it chooses the way: subtracting total amount of pixels of Y value within even fields of a reference frame from total amount of pixels of Y value within even fields of current frame and then getting absolute value of that for being the image shift value of field. Besides, it can also choose the way: subtracting the absolute value of difference between total amount of pixels of Y value within odd fields and even fields of a reference frame from the absolute value of difference between total amount of pixels of Y value within odd fields and even fields of current frame and then getting absolute value of that for being the image shift value of field. Finally, delivering the image shift value of field from one of the three methods described above to the determining unit 16.

After the determining unit 16 receives the $2^{nd}$ threshold delivered from the micro-processing unit 40, compares immediately the image shift value of field with the $2^{nd}$ threshold and then delivers the comparison result (in the format of a signal) to the processing unit of video images 18. When the processing unit of video images 18 receives the comparison result from the determining unit 16, wherein the comparison result shows that the image shift value of field is higher than signal of the threshold, then delivering immediately the image address required of executing de-interlacing to the buffer unit of video images 32. Moreover, the content of the image address contains encoding information of odd fields and even fields. After the buffer unit of video images 32 delivers each image encoding information (from the memory unit 30) to the processing unit of video images 18 in sequence, then completing image de-interlacing by Bob algorithm which is built-in within the processing unit of video images 18. And finally, delivering the processed images to the display unit 50 (for instance, HDTV, PDP or LCD TV) for displaying; in the meanwhile, the processing unit of video images 18 also delivers the image encoding information (from the memory unit 30) to the calculating unit 14 for being a reference frame. Besides, when the processing unit of video images 18 receives the comparison result from the determining unit 16, wherein the comparison result shows that the image shift value of field is lower than signal of the threshold, then delivering immediately the image address required of executing de-interlacing to the buffer unit of video images 32. After the buffer unit of video images 32 delivers each image encoding information (from the memory unit 30) to the processing unit of video images 18 in sequence, then completing image de-interlacing by Weave algorithm which is built-in within the processing unit of video images 18. And finally, delivering the processed images to the display unit 50 for displaying. Besides, when the processing unit of video images 18 is executing de-interlacing process contiguously; in the meanwhile, detecting the encoding information read by the detecting unit 12 contiguously. When the content of the encoding information is detected that it contains an end of the frame, then stops de-interlacing; otherwise, keeping on executing de-interlacing process of the next field.

FIG. 4 schematically shows the block diagram of adaptive de-interlacing of the present invention. Although it's divided into different units, it doesn't indicate that these units (except for the encoding information unit 20 and the display unit 50, configured for input and output respectively) should be the devices existing dependently. These units can be configured and combined in accordance with interface specification and requirement of products. For instance, when being used in the high-level image processing workstation or personal computer (PC) being able to broadcast DVD films, the processing unit of de-interlacing 10 can be embedded in CPU of high-level system or be manufactured into a device (for instance, a chip) singly and then being connected to CPU. When being used in a player (for instance, a DVD player), the processing unit of de-interlacing 10, the memory unit 30 and the micro-processing unit 40 can be integrated into a chip. As the manufacturing of semiconductor develops, SOC (i.e. System on a Chip) technique is also well developed; therefore the processing unit of de-interlacing of the present invention can also be integrated into different application system.

While this invention has been described with reference to illustrative embodiments, this description does not intend or construe in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of adaptive de-interlacing of dynamic image comprising:
   calculating an image shift value of field in accordance with encoding information of said dynamic image;
   comparing said image shift value of field with a threshold for determining a de-interlacing algorithm and then being a basis of de-interlacing process of said dynamic image; and
   executing said de-interlacing algorithm for completing de-interlacing process of said dynamic image.

2. The method according to claim 1, wherein if encoding information of said dynamic image contains motion vectors within P-frame or B-frame of MPEG compression technique, said calculating said image shift value of field further comprising:
   calculating a calculation value of said motion vectors;
   comparing said calculation value of said motion vectors with a first threshold; and
   accumulating the number of times of said calculation value of said motion vectors being greater than said threshold for being said image shift value of field.

3. The method according to claim 1, wherein said calculating said image shift value of field comprising:
   calculating total amount of pixels of Y value within an odd field and an even field of said dynamic image in accordance with I-frame of MPEG compression technique or frame of JPEG compression technique; and
   choosing a calculation method in accordance with total amount of pixels of Y value within said odd field and said even field for being a basis of said image shift value of field.

4. The method according to claim 3, wherein said calculation method can be getting absolute value of difference in total amount of pixels of Y value within odd fields between adjacent frames for being said image shift value of field.

5. The method according to claim 3, wherein said calculation method can be getting absolute value of difference in total amount of pixels of Y value within even fields between adjacent frames for being said image shift value of field.

6. The method according to claim 3, wherein said calculation method can be getting absolute value after subtraction of absolute values of differences between the total amount of pixels of Y value within odd fields and total amount of pixels of Y value within even fields for being said image shift value of field.

7. The method according to claim 1, wherein said comparing said image shift value of field with said threshold comprising:
   choosing Bob algorithm when said image shift value of field being substantially greater than said threshold for being a basis of de-interlacing process of said dynamic image; and
   choosing Weave algorithm when said image shift value of field being substantially less than said threshold for being a basis of de-interlacing process of said dynamic image.

8. An apparatus of adaptive de-interlacing of dynamic image, comprising:
   a detecting unit for receiving and detecting encoding information of a dynamic image to see whether it contains a motion vector or not and then outputting the detection result;
   a calculating unit for calculating and processing encoding information of said dynamic image outputted from said detecting unit and then outputting an image shift value of field;
   a determining unit for receiving and comparing said image shift value of field with a second threshold and then outputting a determination information; and
   a processing unit of a video images for receiving said determination information and then choosing a de-interlacing algorithm for constituting said dynamic image.

9. The apparatus according to claim 8, wherein if result outputted from said detecting unit shows encoding information of said dynamic image contains said motion vector, said calculating unit extracts and calculates said calculation values of said motion vector and then compares said calculation values of said motion vector with a first threshold.

10. The apparatus according to claim 8, wherein if result outputted from said detecting unit shows encoding information of said dynamic image doesn't contain said motion vector, said calculating unit adds the pixels of luminance (Y) within odd fields and even fields of a current frame provided from said detecting unit and then processes calculation for being said image shift value of field and outputting said calculation value.

11. The apparatus according to claim 8, wherein said calculating unit is configured for subtracting total amount of pixels of luminance (Y) within odd fields of an adjacent frame from total amount of pixels of luminance (Y) within odd fields of said current frame and then getting absolute value of that for being said image shift value of field.

12. The apparatus according to claim 8, wherein said calculating unit is configured for subtracting total amount of pixels of luminance (Y) within even fields of an adjacent frame from total amount of pixels of luminance (Y) within even fields of said current frame and then getting absolute value of that for being said image shift value of field.

13. The apparatus according to claim 8, wherein said calculating unit is configured for subtracting absolute value of difference between total amount of pixels of luminance (Y) within odd fields and even fields of a adjacent frame from absolute value of difference between total amount of pixels of luminance (Y) within odd fields and even fields of said current frame and then getting absolute value of that for being said image shift value of field.

14. The apparatus according to claim 8, wherein said processing unit of video images is configured for providing total amount of pixels of luminance (Y) within odd fields and even fields of adjacent frames and then delivering to said calculating unit for processing calculation.

15. The apparatus according to claim 8, wherein said comparison result of said determining unit comprising:
   choosing Bob algorithm when said image shift value of field being substantially greater than said second threshold for being a basis of de-interlacing process of said dynamic image; and
   choosing Weave algorithm when said image shift value of field being substantially less than said second threshold for being a basis of de-interlacing process of said dynamic image.

* * * * *